Nov. 19, 1935.  C. H. SPAULDING  2,021,672
METHOD AND APPARATUS FOR CONDITIONING PRECIPITATES
AND SEPARATING SAME FROM LIQUIDS
Filed Feb. 2, 1934   2 Sheets-Sheet 2

Inventor:
Charles H. Spaulding,
By Dyrenforth, Lee, Chritton & Wiles,
Attys

Patented Nov. 19, 1935

2,021,672

UNITED STATES PATENT OFFICE

2,021,672

METHOD AND APPARATUS FOR CONDITIONING PRECIPITATES AND SEPARATING SAME FROM LIQUIDS

Charles H. Spaulding, Springfield, Ill.

Application February 2, 1934, Serial No. 709,514

9 Claims. (Cl. 210—16)

This invention relates to an improved method of, and apparatus for, conditioning and separating precipitates from a liquid, particularly in water purification systems.

In the purification of water, particularly for domestic consumption, the common practice includes one or more precipitating steps, followed by settling, in order to separate the precipitate. This settling involves considerable expense, inasmuch as it takes a long period of time, and large tanks must therefore be provided. It has been recognized for some time that the addition of large quantities of finely divided solids such as sludge from the settling tank, during the reaction and precipitating stage, accelerates the reactions and shortens the time required for their completion; but the full advantage of this phenomenon has not been realized in practice because it was necessary to collect the sludge from the bottom of the settling tanks and re-pump it into the reaction and precipitating tank. This procedure involved the use of special expensive equipment and had the disadvantage that the sludge which had been removed by sedimentation tended to become malodorous and, in the process of rehandling, its physical properties were changed, so that, when added to the water the second time, it failed to settle thoroughly within a reasonable time and therefore tended to impair the odor and the clarity of the final settled water. The present invention provides a way to utilize the phenomenon of acceleration of the chemical precipitation due to concentration of the precipitated solids without the disadvantages mentioned, and at the same time provides for settling in a briefer period than has heretofore been possible; and also prevents the accumulation of sludge in the settling compartment, so that the process goes on indefinitely without (a) interruption for removing sludge from a settling tank, or (b) the installation of expensive sludge collecting and removing equipment.

Figure 1:
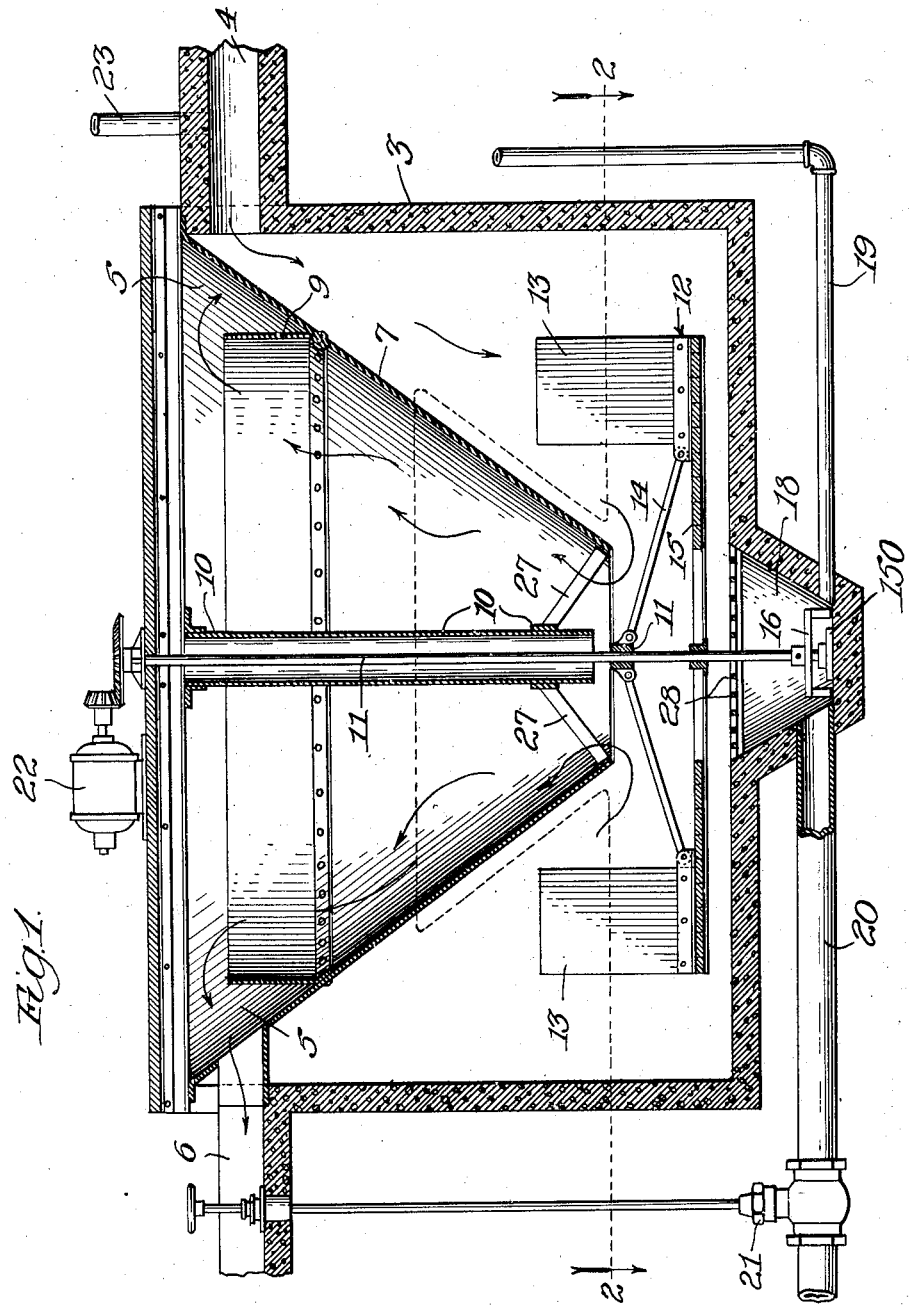
Figure 2:
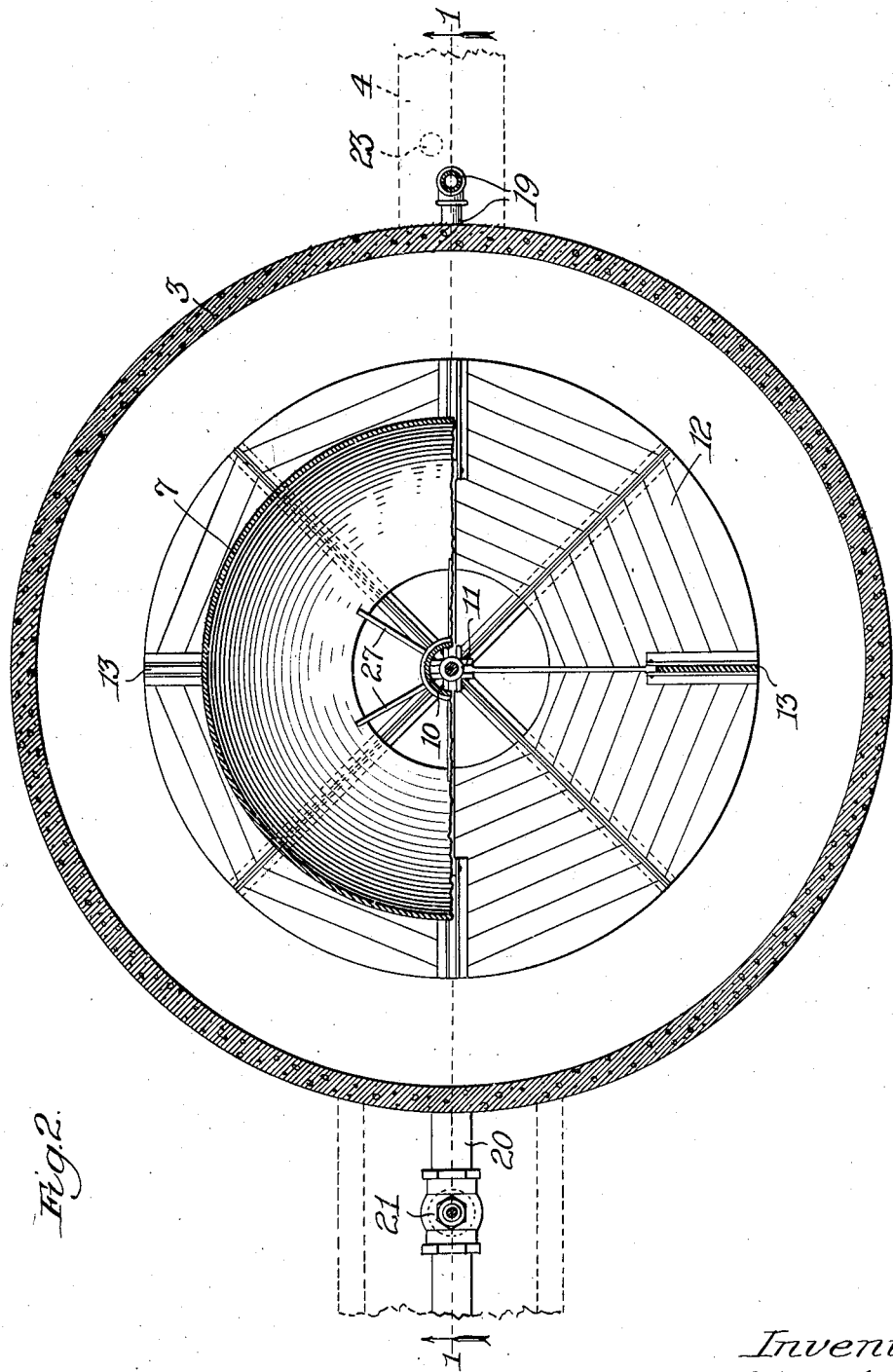

The invention is illustrated in the drawings, in which Fig. 1 shows a front elevation in broken section of the precipitator, and Fig. 2 is a broken sectional plan view taken along the line 2—2 in Fig. 1.

The precipitator comprises a tank 3, say 20 x 32', provided with a water-inlet 4, and overflow troughs 5 which have an outlet pipe 6. Centrally located within the tank 3 is an upwardly expanding truncated conical member or precipitator 7 provided with an annular weir 9, which, together with the side walls of the cone, form the overflow troughs 5. The slope of the cone is steep enough so that the material settling thereon will ultimately slide into the zone of agitation, where deposition is prevented. For precipitation of carbonates and hydroxides from water a slope of 45-60° is normally satisfactory.

Within the conical member is a cylinder 10 containing a shaft 11 which operates a stirrer 12 operating below and outside the cone. The stirrer may be provided with paddles 13 carried on the base 15 and upon arms 14 which are mounted upon the shaft 11. The shaft is journaled in the bearing 150 set in a depression 18 in the bottom of the tank which is below the opening of the conical member or precipitator 7. This depression preferably has steeply sloped side walls and is adapted to trap a part of the precipitated particles and act as a reservoir from which they may be withdrawn as sludge.

The grid, or grate, of crossbars 28 spaced about 1 ft. apart at the top of the sludge depression serves to prevent agitation in this depression.

Sediment or precipitate may be removed through the line 19 which leads to a pump not shown, or by drainage to line 20 controlled by valve 21. Line 20 may suitably be an 18" line, and line 19 a 4" pipe. A sludge rake 16 attached to the shaft 11 moves the sludge and assists withdrawal of sludge through the line 19. The stirrer 12 is operated by the motor 22 which is geared to the shaft 11. Inlet pipes for the application of chemicals may be provided within the precipitator if desired.

The baffle vanes 27 prevent the continuation in the conical compartment of the circular motion imparted to the water in the stirring chamber.

In the operation of the device the liquid is admitted through the line 4, either with precipitant already added, or adding it through line 23, and then passes into the main section of the tank 3, its course being indicated by arrows. The liquid is stirred by the paddle wheels 13 and the stirrer 12, so that a precipitate forms and begins to circulate in the tank. The stirrer revolves slowly, for example at a rate such that the stirrer is moving 1 to 2 feet per second at a point ⅔ of the way from the center to the edge of the tank. In a 32-foot tank this means about two revolutions per minute.

In the preliminary stirring the precipitate has an opportunity to grow in particle size and the coarser particles tend to settle in the sludge depression. The liquid bearing part of the unsettled precipitate, then passes through the narrow opening of the precipitator and rises within it. As the liquid rises, the velocity of movement decreases rapidly, since the area of the cone increases as a function of the square of the height. As the velocity decreases, therefore, the ability of the water to carry particles likewise decreases rapidly, and at a certain level the precipitate suddenly ceases to rise further due to the low upward velocity. This level is rather sharply defined for the reason that the separation of the precipitate itself further slows the velocity above, because the free-cross-sectional area of the cone is increased thereby as well as by the slope of the sides. Part of the precipitate becomes agglomerated into large enough particles to sink against the velocity of the water entering the conical precipitator, thereby increasing the concentration of particles in the mixing compartment from which they are ultimately removed through the sludge trap. The escape of particles from the precipitator is facilitated by inequalities of velocity at the entrance of the precipitator by which intermittent back-flow occurs at various localized points, thus carrying back the accumulated solids. In the normal precipitation of carbonates and hydroxides from water by lime, a very fine slurry or sludge will be formed. The retention of this sludge within the mixing tank accelerates the formation and growth of precipitated particles which ultimately are trapped in the depression 18, from which they may be removed as desired. This depression is normally full of sludge due to absence of the agitation which is going on above. If no sludge is withdrawn from the depression pocket the number of particles in suspension increases. But if the sludge is removed from the depression, the number of particles in suspension diminishes to the extent that sludge is withdrawn.

The clear water finally passes into the overflow trough 5 and is removed through line 6.

In some operations, particularly in the beginning, it may be desirable to add seed within the precipitator to augment the sludge formed therein. For this purpose precipitated particles may be used, but it has been discovered that the use of ground coal, especially anthracite, is very desirable, particularly in the purification of domestic water. The particles are sufficiently light to float with the precipitates during the stirring, but have sufficient bulk to separate rapidly from the water when it reaches the precipitator. They likewise may act as adsorbents, but for this purpose are not so powerful as activated carbon. Activated carbon may be used in a coarse form as seed.

In the operation of the apparatus shown in connection with the purification of domestic water supply, the throughput may be quite rapid. For example, with a tank 32 feet by 20 feet containing a cone having a bottom opening of 8 feet and approximately 15 feet in height, 1.4 million gallons may be treated in 24 hours, based upon a limiting upward velocity of approximately 2 inches per minute at the top of the cone, when the precipitating agent is lime or soda ash, or both, and the precipitate formed consists of carbonates of calcium and magnesium and hydroxides of magnesium, iron, etc.

The process may be used with other liquids than water, and for other precipitates.

The foregoing detailed description has been given for clearness of understanding only, and no unnecessary limitations should be understood therefrom; but the appended claims should be construed as broadly as permissible, in view of the prior art.

What I regard as new, and desire to secure by Letters Patent is:

1. In the precipitation of impurities from domestic water supply, the step of accelerating the settling of the precipitate by seeding the precipitating water with coarse activated carbon.

2. The method of softening water, comprising first mixing the raw water with a soluble precipitating agent in an agitating zone and then flowing the mixed water, reagent and partly formed sludge upwardly through a quiescent precipitating zone open at the bottom and free from undissolved precipitating agent and causing the water to rise through the precipitating zone at constantly decreasing velocity, the velocity at the bottom being sufficient to support all but large sludge particles and that at the top being insufficient to support any substantial sludge particles whereby a considerable volume of sludge remains suspended in the lower part of the precipitating zone and acts as seed and the larger particles as formed descend out of the precipitating zone.

3. The method of claim 2, in which the precipitating zone is open at the bottom to the agitating zone and the large sludge particles descend by gravity to the agitating zone for ultimate removal.

4. The method of claim 2, in which seed is added to the precipitating zone.

5. The method of claim 2, in which seed in the form of powdered coal is added to the precipitating zone.

6. The method of claim 2, in which seed in the form of coarse activated carbon is added to the precipitating zone.

7. Apparatus of the character described, comprising a coagulating vessel, means for supplying raw water and reagent thereto, means for agitating the water and reagent, and a precipitating vessel of relatively small cross-sectional area at its bottom and enlarging cross-sectionally toward the top, the bottom of the precipitating vessel being in free, open and direct communication with the coagulating vessel whereby water may rise through the bottom of the precipitating vessel and large particles of sludge may descend vertically to the coagulating vessel countercurrent to the rising water.

8. Apparatus of claim 7, in which the coagulating and precipitating vessels are generally in the same vertical plane and the bottom of the precipitating vessel opens into the lower part of the coagulating vessel.

9. Apparatus of claim 7, in which the coagulating vessel is smaller at its top than at its bottom and flares correspondingly and oppositely to the precipitating vessel, the two vessels being generally in the same vertical plane and the bottom of the precipitating vessel opening into the lower part of the coagulating vessel.

CHARLES H. SPAULDING.